United States Patent [19]

Ogihara et al.

[11] 3,849,788
[45] Nov. 19, 1974

[54] SHUTTER ASSEMBLY FOR A CAMERA

[75] Inventors: Masuo Ogihara; Masanori Watanabe, both of Chiba, Japan

[73] Assignee: Seiko Koki Kabushiki Kaisha, Tokyo, Japan

[22] Filed: May 29, 1973

[21] Appl. No.: 364,280

[30] Foreign Application Priority Data
May 26, 1972  Japan.............................. 47-62161

[52] U.S. Cl. .............................................. 354/226
[51] Int. Cl. ............................................. G03b 9/08
[58] Field of Search..................... 95/53 R; 354/226

[56] References Cited
UNITED STATES PATENTS
3,199,427  8/1965  Gorey .................................... 95/53
3,276,343  10/1966  Spiesst .................................. 95/53

Primary Examiner—Samuel S. Matthews
Assistant Examiner—Michael L. Gellner
Attorney, Agent, or Firm—Robert E. Burns; Emmanuel J. Lobato; Bruce L. Adams

[57] ABSTRACT

A shutter assembly for a camera comprises a front ring upon which the lens system is mounted and a support plate connected through a set of spacer elements to the front ring such that a preselected space exists between the front ring and the support plate. A shutter case is mounted in the preselected space in a substantially compression-free state between the front ring and the support plate and the shutter case has a housing formed therein in which is housed a set of shutter blades. The front ring, spacer elements and support plate comprise a rigid unitary construction which is affixed directly to the camera body whereby external forces applied to the front ring or the lens system are transmitted by the rigid construction to the camera body without being transmitted to the shutter case.

8 Claims, 1 Drawing Figure

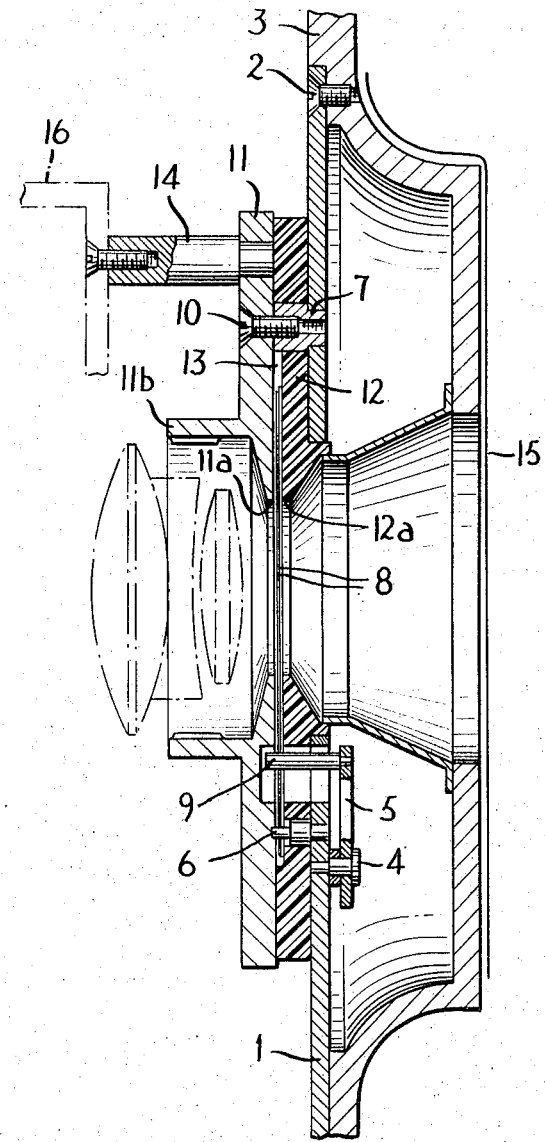

SHUTTER ASSEMBLY FOR A CAMERA

The present invention pertains to a shutter assembly for a camera and more particularly, to that portion of the shutter assembly which houses the shutter exposure blades.

It is well known in the art to construct a shutter assembly for a camera by superimposing a front ring upon which is mounted the lens system and other attachments with a shutter case in which is housed the shutter blades. The shutter case is sandwiched between the front ring and the camera body and the typical prior art system is known as a pile-up or stacked system in which first the shutter case is fixed to the camera body and then the front ring is fixed on the shutter case. The front ring, shutter case and camera body constitute a unitary rigid assembly and any external forces applied to the lens system or other attachments are transmitted through the front ring to the shutter case and then to the camera body. Thus, in these prior art constructions, the front ring and the shutter case must both be manufactured out of strong materials having sufficient strength to withstand the shocks and strains resulting from the applied external forces.

Thus these prior shutter assembly constructions are disadvantageous since it is difficult to make a compact assembly and the cost of materials is fixed since the parts must be manufactured out of relatively expensive materials which have sufficient strength to withstand the forces normally encountered during use of the camera. In addition, the prior art shutter assemblies are relatively complex in construction and take too long a period of time to assemble.

It is therefore a primary object of the present invention to provide a shutter assembly construction which overcomes the aforementioned shortcomings and disadvantages.

It is another object of the present invention to provide a shutter assembly wherein the shutter case which houses the shutter blade is composed of a material which is lesser in strength and composed of a material which is cheaper in cost than other components in the shutter assembly thereby reducing the overall cost of the shutter assembly.

It is a further object of the present invention to provide a shutter assembly which is simple in construction and easy to assemble yet which is suitably rugged in nature to withstand the normal forces applied thereto during use.

The above and other objects of the present invention are carried out by providing a shutter assembly composed of a front ring upon which the lens system and other attachments are mounted and connecting the front ring to a base plate of the camera body by means of a set of spacer elements. The spacer elements effectively space apart the front ring from the base plate leaving a preselected space therebetween and the shutter case is housed within this space. The front ring, the spacer elements and the base plate are all formed of comparatively strong material and are assembled together to form a unitary rigid construction so that any external forces applied to the lens system or the other attachments are effectively transmitted through this rigid construction to the camera body without being transmitted to the shutter case. The shutter case may thus be formed of a weaker strength material and is preferably formed of plastic. The thickness of the shutter case is slightly less than the distance determined by the spacer elements so that the shutter case is effectively isolated from the externally applied forces.

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawing.

The single figure of drawing is a cross-sectional view of a camera embodying the shutter assembly of the present invention.

As seen in the single figure of drawing, a shutter assembly for a camera lens system is constructed in accordance with the principles of the present invention. A base plate or support plate 1 is rigidly attached by means of screws 2 to the camera body 3. The remainder of the camera body is not shown and such does not comprise part of the present invention and the invention pertains to a shutter assembly which is readily adaptable to various types of cameras. The particular shutter blade mechanism is known in the art and is disclosed, for example, in Japanese Patent Application No. 42167/1968.

The support plate 1 includes an opening therethrough which is aligned with the lens system of the camera. A lever 5 is pivotally mounted by means of a pin 4 on the inner face of the support plate 1 and another pin 6 is attached to the support plate and extends from the outer major face of the support plate. A set of shutter exposure blades 8 are loosely mounted on the end of the pin 6 for free movement therearound. As is known in the art, the shutter blades have arcuate grooves therein and a rod 9 extends through the grooves as shown in the drawing. One end of the rod 9 is connected to the lever 5 and by such a construction, the shutter blades 8 may be opened and closed in response to pivotal movement of the lever 5.

A first member comprising a front ring 11 is attached to the outer major face of the support plate 1 and the front ring 11 has a central opening 11a therethrough which defines the shutter aperture. Interposed between the front ring 11 and the support plate 1 is a second member comprising a shutter case 12 which also has a central opening 12a therethrough and this opening is aligned with the opening 11a in the front ring 11. The shutter case 12 has a recessed portion 13 comprising a shutter blade compartment which houses therein the set of shutter blades 8.

Connecting means is provided for connecting the front ring 11 to the support plate 1 with a predetermined distance therebetween and the shutter case 12 is mounted within this space. The connecting means comprises a set of spacer elements 7 (only one of which is shown in the drawing) interposed between the front ring 11 and the support plate 1 to establish the predetermined spacing distance. The spacer elements 7 each have a stepped configuration and have a smaller diameter portion and a larger diameter portion. The smaller diameter portion is inserted into corresponding holes provided in the support plate 1 and the axial length of the larger diameter portion determines the spacing distance. A screw 10 is inserted through the front ring 11 and threaded into the interior of each spacer element 7 which is provided with a set of internal threads for this purpose.

The axial extent of the larger diameter portion of the spacer element 7 determines the predetermined spacing distance and this distance is slightly greater than the thickness of the shutter case 12. The reason for this is to form a rigid construction composed of the front ring 11, the spacer elements 7 and the support plate 1 with the predetermined spacing existing between the front ring 11 and the support plate 1. The shutter case 12 is housed within this space and is retained in position by the spacer elements 7. The shutter case 12 may therefore be manufactured with less precision and out of a material having much less strength than has heretofore been possible since it is not necessary for the shutter case to withstand external forces which may be applied to the camera and instead, these forces are transmitted from the front ring 11 through the spacer elements 7 directly to the support plate 1 and then to the camera body 3. In actual practice, the shutter case 12 is constructed out of plastic and this greatly reduces the material costs as well as reducing the overall manufacturing costs for the camera.

During the assembling operation of the shutter assembly, the spacer elements are inserted into the openings in the support plate 1 and then the shutter case 12 is placed over the spacer elements after which the front ring 11 is superposed over the shutter case. The screws 10 are then threaded into the spacer elements and tightened down to rigidly attach the front ring 11 to the support plate 1. The spacer elements 7 are either pressed-fitted into the support plate openings or they may be bonded or otherwise affixed to the support plate. Since the thickness of the shutter case 12 is less than the axial thickness of the larger diameter portion of the spacer elements, the shutter case 12 is not compressively deformed during tightening down of the screws 10 and is maintained in a substantially compression-free state.

A lens hood mounting ring 16 is connected to the front ring 11 by means of an interconnecting rod 14. In place of the lens hood mounting ring or in addition thereto, other attachments for the camera may be connected to the front ring 11 as well known in the art. The lens system is shown in phantom lines and is mounted on a circular collar 11b which comprises part of the front ring 11.

During operation of the shutter assembly, the lever 5 is pivotally actuated to effect opening and closing of the shutter exposure blades 8 thereby momentarily opening the shutter aperture. Light thus passes through the aperture and is focused by the lens system upon the light-sensitive film 15 thereby exposing the film.

Thus, in accordance with the shutter assembly construction described above, any external forces which are applied to either the lens system, the lens hood mounting ring or other attachments are not transmitted to the shutter case 12 and instead are transmitted from the front ring 11 through the spacer elements 7 to the support plate 1 and are effectively distributed to the camera body. Hence, no force is applied to the shutter case 12 and this component may be formed of plastic or other material having less strength than the front ring 11, the spacer elements 7 and the support plate 1. This is advantageous since it simplifies the overall manufacturing operation and reduces the cost of materials. Moreover, any deformation of the shutter case 12 which may occur will be confined solely to the shutter case itself and will not affect the accuracy of the lens system.

The invention has been described in conjunction with one particular embodiment and it is to be understood that obvious modifications and changes may be made therefrom without departing from the spirit and scope of the invention as defined in the appended claims.

We claim:

1. In a photographic shutter assembly for use with a camera: a support plate having opposed major faces and having an opening therethrough; a first member spaced from one major face of said support plate and having an opening therethrough defining a shutter aperture in alignment with the support plate opening; connecting means rigidly interconnecting said first member to said support plate to form therewith a unitary rigid construction with a predetermined space existing between said first member and said one major face; a second member disposed in said space and having an opening therethrough in alignment with both said other openings; means defining a compartment between said first and second members; a set of shutter blades housed within said compartment; and means on said support plate and said first member mounting said set of shutter blades for opening and closing movement to effect corresponding opening and closing of said shutter aperture.

2. In a photographic shutter assembly according to claim 1; wherein said predetermined space has a width dimension, extending between said first member and said one major face, which is slightly greater than the width of said second member to thereby maintain said second member in a substantially compression-free state between said first member and said support plate.

3. In a photographic shutter assembly according to claim 2; wherein said second member is composed of a material having lesser mechanical strength than that of said rigid unitary construction.

4. In a photographic shutter assembly according to claim 2; wherein said second member is composed of plastic.

5. In a photographic shutter assembly according to claim 1; wherein said connecting means includes a set of spacer elements interposed between and interconnected to said first member and said support plate thereby establishing said predetermined space between said first member and said support plate.

6. In a photographic shutter assembly according to claim 5; wherein each spacer element has a stepped configuration comprised of a smaller diameter portion and a larger diameter portion, and wherein said support plate has holes therein respectively receiving therein the smaller diameter portions of said spacer elements so that said larger diameter portions of said spacer elements abut between said first member and said support plate.

7. In a photographic shutter assembly according to claim 1; wherein said first member comprise a ring having means for mounting thereon a lens system during use of the photographic shutter assembly.

8. In a photographic shutter assembly according to claim 1; wherein said first member is spaced completely from and out of direct contact with said support plate.

* * * * *